April 2, 1963 T. K. JAMISON 3,083,581
POWER GENERATING SYSTEM
Filed Aug. 16, 1957 2 Sheets-Sheet 2
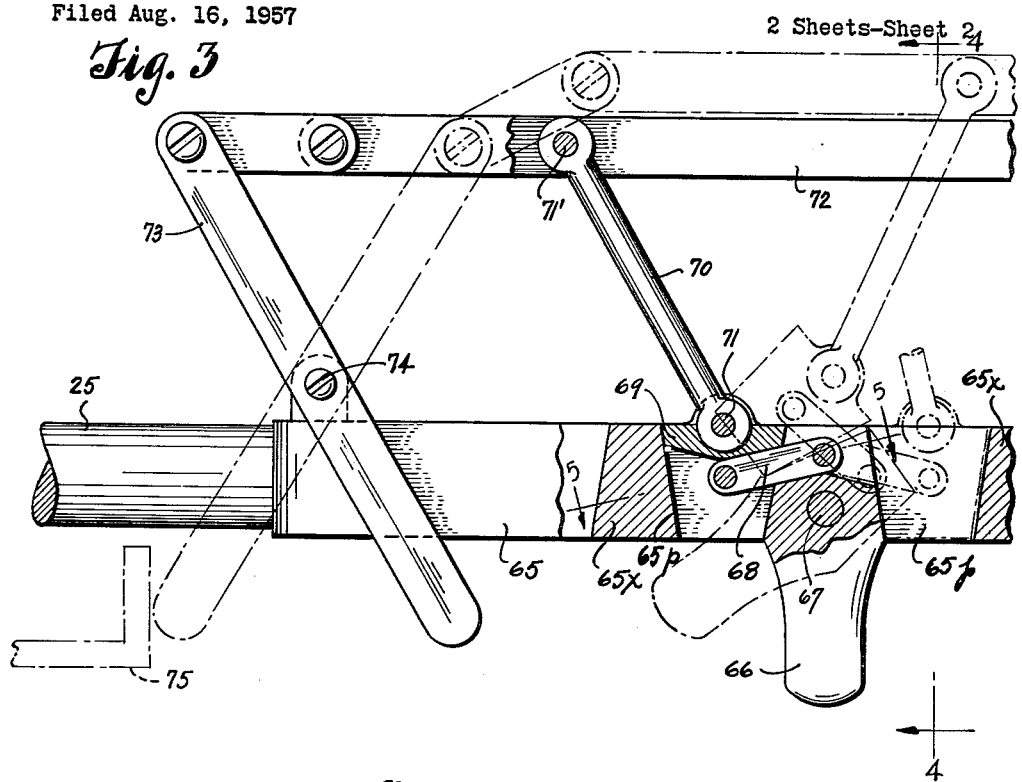
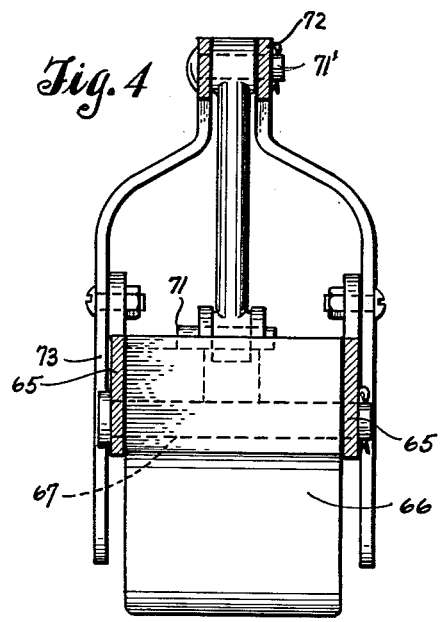
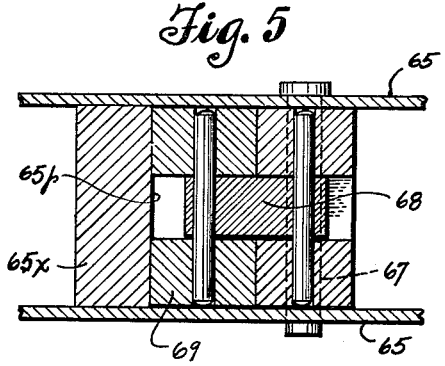
INVENTOR.
TRUMAN K. JAMISON
BY
Robinson + Berry
ATTORNEYS

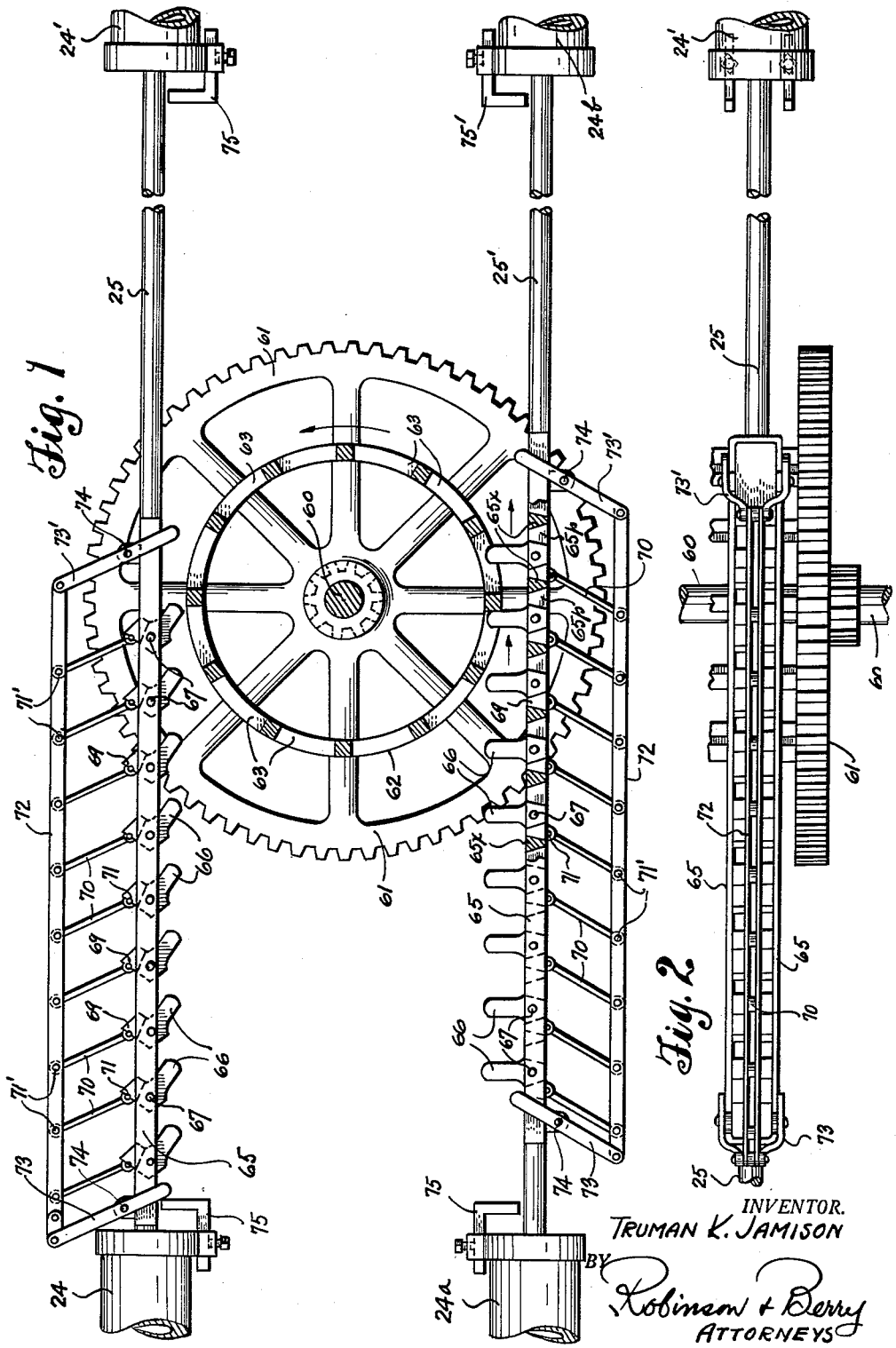

United States Patent Office 3,083,581
Patented Apr. 2, 1963

3,083,581
POWER GENERATING SYSTEM
Truman K. Jamison, 1708 Smith Tower, Seattle, Wash.
Filed Aug. 16, 1957, Ser. No. 678,638
1 Claim. (Cl. 74—128)

This invention relates to a power transmission system that is characterized by use of two parallel, coextensive piston rods, reciprocating in unison to alternately transmit driving force to a power transmitting wheel disposed between said rods and driven continuously thereby in the same direction through the mediacy of novel pawl and ratchet mechanisms applied to said rods and wheel.

It is the principal object of this invention to provide a system as above stated that is practical, and positive in the converting of the driving power applied to reciprocating piston rods to a rotatable power shaft.

It is a further object of the invention to provide a system of control that permits the driving of the power shaft selectively in a forward or reverse direction.

In accomplishing the above mentioned and various other objects of the invention which will be disclosed as the description progresses, I have provided the improved details of construction, the preferred forms of which are illustrated in the accompanying drawings, wherein:

FIG. 1 is an elevational detail of the pawl and ratchet mechanisms of the present invention.

FIG. 2 is a plan or top view of mechanism disclosed in FIG. 1.

FIG. 3 is an enlargement of a fragmental portion of a pawl mounting bar of the mechanism shown in FIG. 1, particularly illustrating the pivotal action of a pawl and its actuating linkage.

FIG. 4 is a vertical cross-section taken on line 4—4 in FIG. 3.

FIG. 5 is a section taken on the plane of line 5—5 in FIG. 3.

Referring more in detail to the drawings:

The present power transmission system is seen in FIGS. 1 and 2 to comprise two sets of oppositely disposed hydraulic cylinders designated, respectively, as the "upper set" 24 and 24' and the "lower set" 24a and 24b. Cylinders of each set are axially aligned and their axial lines are in parallel, vertically spaced relationship. A piston rod 25 extends between the cylinder 24 and 24' and a piston rod 25' likewise extends between the cylinders 24a and 24b; these rods being equipped at their ends with the usual pistons that are reciprocable in the corresponding cylinders.

It is further to be explained that the hydraulic pressure medium is admitted to the cylinders in such manner as to effect reciprocation of said rods in unison and to equal extent. This application of fluid pressure medium to the four cylinders may be effected by any of the conventional means as for example the application of steam to the cylinders of a locomotive that employs two cylinders at each side of the engine.

The two piston rods 25—25' which extend between the paired cylinders are disposed respectively above and below a transversely directed power shaft 60 mounted for rotation. Fixed on shaft 60 is a power transmitting gear 61 to which a ratchet wheel 62 is coaxially fixed. The ratchet wheel 62 is formed about its entire circumference with pawl receiving sockets 63 in even spacing as well shown in FIG. 1.

A longitudinal portion of each piston rod 25—25' comprises two coextensive laterally spaced bars 65 as shown in FIG. 2, and mounted between these bars and along the same, is a series of equally spaced pawls 66, each pawl being mounted by a pivot 67 for swinging adjustment in opposite directions from a position perpendicular to the rod. The pawls 66 on the lower piston rod 25' in FIG. 2 are adapted, when in vertical position, and both the rods moving to the right, to be received in the sockets of the ratchet wheel 62 to drive the wheel in a counter-clockwise direction. Then when these pawls are tilted to a position corresponding to but opposite to that in which the pawls of the upper bar are shown, they will clear the gear 62 on the return stroke of the rod 25'.

The mode of operation of the apparatus as seen in FIG. 1 is such that the piston rods reciprocate in unison. As they move to the right, from the positions of FIG. 1, the pawls of the lower rod mesh with and drive ratchet gear 62 thus to rotate ratchet gear 62 counter-clockwise. Then, as the rods move from right to the left, the pawls of the upper rod are caused to be positioned to mesh with the ratchet gear 62 to drive it counter-clockwise and the pawls of the lower rod are positioned to clear the ratchet gear. As the rods reach their limit of travel in either direction, the pawls thereon are reversed in their positions, thus a continuous drive is provided between the hydraulic cylinders and the shaft 60.

The means provided for the adjustment of the pawls 66 as pivotally mounted on the piston rods between their driving and non-driving positions, is shown in FIGS. 1 to 5, wherein it is first to be observed that the two parallel and coextensive bars 65 between which the pawls are pivotally mounted are joined between the pawls by spacer blocks 65x, each having upwardly converging opposite surfaces as best observed in FIG. 3. Between each of these spacer blocks 65x and the adjacent pawls are the wedge shaped pockets 65p formed by the upwardly sloped surfaces of blocks and pawls. Swingingly attached to the upper end portion of each pawl by means of a short link 68 is a wedge block 69. These wedge blocks are adapted to be swung from one pocket into the other across the top of the corresponding pawl as has been indicated in FIG. 3 thus to lock the pawl either in what will be referred to as its forward or its reverse driving position, or to swing the pawl between driving and non-driving positions. To provide for the simultaneous adjustment of all pawls as carried on either piston rod, a link 70 is associated with each wedge block 68, being pivotally attached at one end, as at 71, to the upper end of the block and attached pivotally at its other end as at 71' to an elongated link 72 that extends along the piston rod. At their opposite ends, the links 72 as associated with the pawls of the upper and lower piston-rods are pivotally connected with rocker levers 73 and 73' and these are pivotally mounted on the piston rods, as at 74; each lever 73 and 73' having its inner end portion extended to a position at which it will be caused to engage a stop bracket 75, that is adjustably mounted on the corresponding cylinder as the piston rod reaches the end of a stroke. The arrangement of levers 73—73' provides that as the two piston rods 25—25' move to the right, the right hand lever 73' of the lower rod will ultimately engage the stop 75' at that side, and rock the lever to shift the corresponding link 72 to the right relative to the rod and cause all the wedge blocks connected therewith to be swung clear of their pockets 65p and the pawls swung to positions at which they will clear the ratchet gear as the piston rod subsequently moves to the left. Likewise, the right hand trip lever 73' for the link 72 carried by the upper piston rod strikes the corresponding stop arm 75 and actuates all pawls 66 of that rod to their ratchet gear driving positions so that, as the rod 25 moves to the left it will cause the pawls to impart counter-clockwise driving force to the ratchet gear 62. Thus, with travel of the rods 25—25' in opposite directions the ratchet wheel 62 is caused to be continuously driven to drive the shaft 60 continuously in a like direction.

The present power transmission system has various adaptations which will be readily understood by persons familiar with such devices. Reciprocating power provided by piston rods is transmitted to ratchet gear 62 and may be applied to a machine or part to be driven through gear 61, 62 or shaft 60.

What I claim as new is:

A power generating system comprising a pair of power cylinders mounted in spaced, axial alignment, a piston reciprocally fitted in each cylinder, a piston rod common to both cylinders operatively connecting said pistons and means for the application of pressure medium to said cylinders in such manner as to effect the reciprocal actuation of said pistons and rod; a power transmission ratchet wheel mounted for rotation, a succession of pawls pivotally mounted on the piston rod and adjustable thereon to positions for driving engagement with the ratchet wheel when the piston rod is moved in one direction and adjustable to non-engaging positions when the rod is moved in the opposite direction, and a pawl adjusting means comprising, a link extending along the piston rod and joining all pawls for their simultaneous adjustment between ratchet wheel driving and non-driving positions, stops fixed at opposite ends of the reciprocal travel of the piston rod and positioned for engagement by and for actuating said link to reverse the pawls as the piston rod reaches each end of its travel.

References Cited in the file of this patent

UNITED STATES PATENTS

| | | |
|---|---|---|
| 21,065 | Chapman | Aug. 3, 1858 |
| 427,496 | Bell | May 6, 1890 |
| 681,116 | Grant | Aug. 20, 1901 |
| 797,619 | Shed | Aug. 22, 1905 |
| 924,003 | Schoell | June 8, 1909 |
| 1,084,512 | Weikel | Jan. 13, 1914 |
| 1,123,172 | Compton | Dec. 29, 1914 |
| 1,565,976 | Woods | Dec. 15, 1925 |
| 1,652,554 | Bolgiano | Dec. 13, 1927 |
| 1,939,887 | Ferris et al. | Dec. 19, 1933 |
| 2,185,277 | Stelzer | Jan. 2, 1940 |
| 2,215,157 | Platzner | Sept. 17, 1940 |
| 2,270,690 | Shannahan | Jan. 20, 1942 |
| 2,282,194 | Lamond | May 5, 1942 |
| 2,316,926 | Willett | Apr. 20, 1943 |
| 2,604,078 | Chelminski | July 22, 1952 |
| 2,646,235 | Dawson | July 21, 1953 |
| 2,676,771 | Mayo | Apr. 27, 1954 |
| 2,730,065 | Piper | Jan. 10, 1956 |
| 2,807,142 | Anderson | Sept. 24, 1957 |